Aug. 20, 1968   J. I. JOHANSSON   3,397,443
METHOD FOR THE MANUFACTURE OF CYLINDRICAL CONTAINERS
PARTICULARLY SO-CALLED CISTERNS
Filed Sept. 2, 1965   2 Sheets-Sheet 1
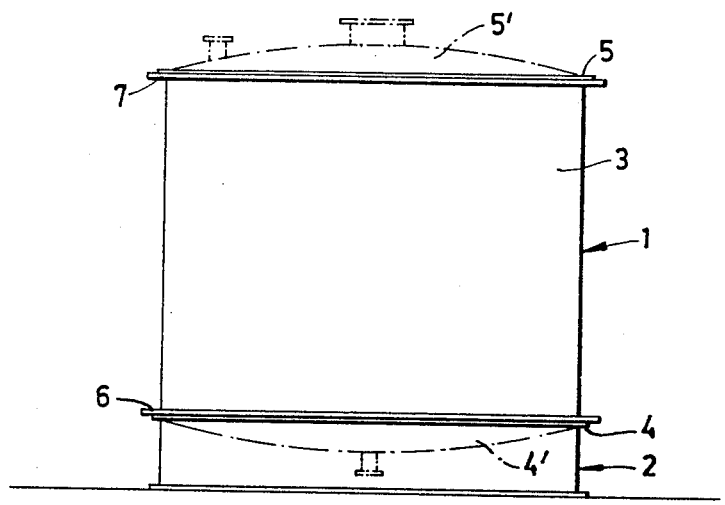
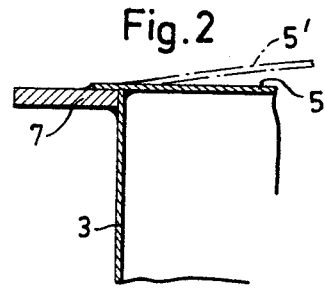 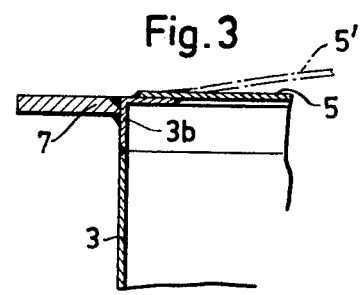
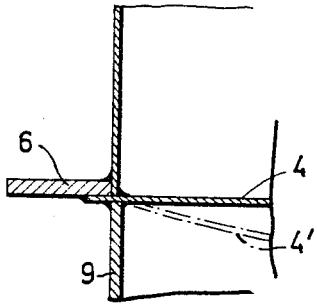 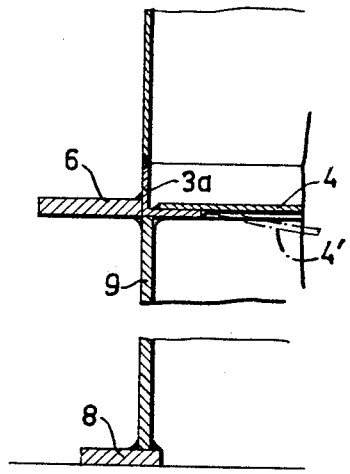

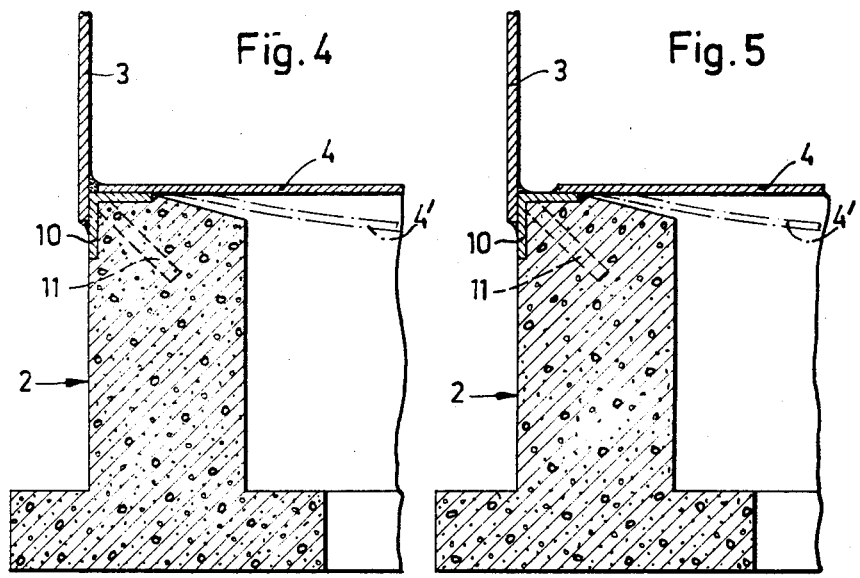
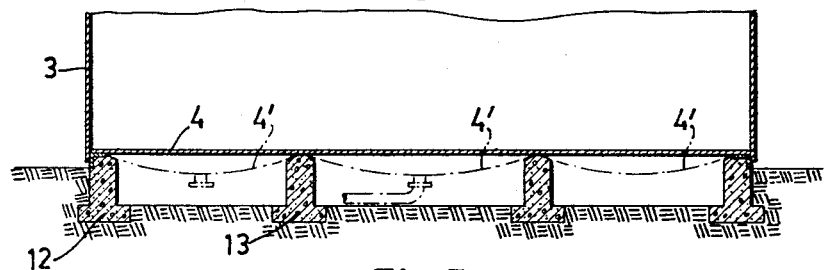
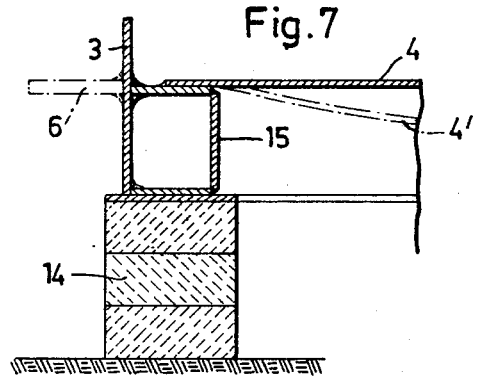

United States Patent Office 3,397,443
Patented Aug. 20, 1968

3,397,443
METHOD FOR THE MANUFACTURE OF CY-
LINDRICAL CONTAINERS PARTICULARLY
SO-CALLED CISTERNS
Johan Ingvar Johansson, Avesta, Sweden, assignor to
Avesta Jernverks Aktiebolag, Avesta, Sweden, a corporation of Sweden
Filed Sept. 2, 1965, Ser. No. 484,583
Claims priority, application Sweden, Sept. 3, 1964,
10,572/64
4 Claims. (Cl. 29—421)

ABSTRACT OF THE DISCLOSURE

The present invention pertains to a method for the manufacture of upright cyclindrical containers, particularly cisterns, which comprises making the bottom of the container from essentially flat plates of austenitic stainless steel and joining them together by welding, then welding a stiffening means to the bottom adjacent the periphery of the bottom, whereby increased resistance to inwardly directed radial forces is achieved, and subjecting the welded assembly to the influence of an internal fluid pressure of such a magnitude that the bottom is cold-stretched to a permanent cupped shape.

The present invention relates to a method for the manufacture of cylindrical containers, particularly cisterns, which are intended to be subjected in operation to an internal overpressure (liquid pressure, gas pressure or a combination of both these types of pressure) and in which the bottom and possibly also the top is manufactured from essentially plane plates, which are joined together by welding.

Such containers or cisterns are usually manufactured with a plane bottom. In containers having not too large a diameter the plane bottom is usually manufactured by buttwelding of the required number of plates placed in abutting position, whereas in containers with larger dimensions the bottom is formed by plates joined together by overlapping welding or buttwelding against underlying strips.

The known methods for the manufacture of containers of the kind referred to above are associated with a number of inconveniences which are particularly marked in containers of larger dimensions. By way of example, the following specific inconveniences in connection with the known manufacturing methods may be mentioned.

(A) An expensive foundation for the containers is required because the entire bottom surface must be supported.

(B) Because of the fact that the plates which form the bottom are deformed and shrink in connection with the welding operation, it is very difficult to obtain a bottom which is at least reasonably smooth.

(C) Because the bottom rests on the foundation along its entire undersurface it is very difficult to control the tightness of the bottom.

(D) In the zone where the cylindrical wall and the bottom wall are joined together considerable stresses are set up which become particularly dangerous at low temperatures.

(E) The containers cannot be completely emptied because the bottom is not smooth and plane.

(F) The bottom, which in the known containers usually consists of carbon steel, cannot be subjected to protective treatments at its underside wherefore there is a risk for corrosion at all welding joints.

(G) In certain cisterns there is also a risk for corrosion at the inside of the bottom, since a complete removal of condensed water cannot be effected. This inconvenience is the one among those enumerated above which seemingly involves the greatest moment of risk.

It is an object of the present invention to eliminate the inconveniences found in the known manufacturing methods. According to the invention this object has been attained by using as a material for the bottom an austenitic stainless steel and by subjecting the container, after completion to the action of an internal fluid pressure of such magnitude that the bottom is cold-stretched to an outwardly convex or cupped shaped, whereby folds and uneven portions that may exist before the cold-stretching operation are evened out. The manufacturing method according to the invention offers, among others, the following advantages as compared with previously known methods.

(A) A simple annular foundation can be used, since the bottom of the container need be supported only along its outer edge. In very large containers it may, however, be suitable to complement the outer foundation ring with one or more inner foundation rings which are concentric with the outer ring. Even the latter construction of the foundation involves, however, a considerable simplification in comparison with foundations used for conventional cisterns.

(B) The bottom may be manufactured without any requirements for planeness, since all unevennesses and folds, for example such as are set up in connection with the welding operation, are evened out as a result of the cold stretching the bottom.

(C) The tightness of the bottom can be controlled in a simple and satisfactory manner, because a very good accessibility to the underside of the bottom is obtained.

(D) The choice of austenitic stainless steel as material for the bottom entails that the bottom cannot crack and will have a satisfactory toughness also at low temperatures.

(E) The cistern can be completely emptied, because of the cupped shape of the bottom obtained through the cold-stretching operation.

(F) Sediments and condensation water thus can also be tapped of.

(G) There will be no risk for corrosion neither on the upper nor on the under side of the bottom.

For the cold-stretching of the bottom there is usually used, according to the invention, an internal fluid-overpressure amounting to at least the calculated maximum internal overpressure in normal operation, in certain cases considerably higher.

In preferred embodiments of the invention there are provided, along the circumference of the bottom, stiffening members which are connected with the bottom and are capable of taking up inwardly directed radial forces. Such stiffening members may, for example, consist of one or more annular flanges welded to the cylindrical wall or shell of the container, or of an annular foundation for the containers, preferably one made of concrete with one or more cast-in steel rings which are connected through welding with the lower edge of the cylindrical wall and/ or with the outer edge of the bottom.

According to a further feature of the invention the top wall of the container may be manufactured in a manner analogous to the manner of manufacturing the bottom. The top then is manufactured from substantially plane plates of austenitic stainless steel which are jointed in known manner by welding, whereupon the top is cold-stretched to an outwardly convex or cupped shape simultaneously with the cold-stretching of the bottom and, possibly, the shell. Stiffening members are then provided also at the upper edge of the shell for taking up the radial forces set up during the cold-stretching operation.

Naturally, the top may initially be made as a cupped wall, possibly with a pressed or forged flange.

In certain types of cisterns ordinary carbon steel can be used as material for the cylindrical wall and for the top wall.

The invention also comprises a cylindrical container manufactured in the manner set out above.

The invention will now be described more closely with reference to the accompanying drawings, on which FIGURE 1 shows a side view of a container manufactured according to the invention, FIGURES 2 and 3 show, in section and on a larger scale, partial views of two alternative embodiments of the container shown in FIGURE 1, and FIGURES 4 to 7 show, also in section and on a larger scale, partial views of some further embodiments of the invention selected as examples.

In FIGURE 1 the reference numeral 1 designates a container in the shape of a circular cylinder resting on an annular foundation 2. The container 1 consists, as is clearly shown in FIGURES 2 and 3, of a cylindrical wall or shell 3, a bottom 4 welded to the lower edge of the latter, and a top 5 welded to the upper end of the shell. The bottom 4 and the top 5 consist of a number of plates of austenitic stainless steel welded together through buttwelding. Also the shell 3 can be made from the same material, preferably using pre-stretched plates having an increased yield point. Welded to the lower and to the upper end of the shell are external annular flanges 6 and 7. Said flange rings have for their purpose to take up the very high radial forces to which the end portions of the shell are subjected, when the container, after completion, is subjected to an internal fluid pressure for the purpose of cold-stretching the bottom and the top of the outwardly convex or cupped shape indicated on the drawings with dot and dash lines. The cold-stretched cup-shaped bottom is designated 4 and the cold-stretched top is designated 5. The containers shown in FIGURES 2 and 3 are supported by a steel foundation 2 consisting of an annular footplate 8 and a cylindrical member 9 which supports the container at its upper end. In the container shown in FIGURE 2 the bottom 4 and the top 5 extend radially beyond the shell 3 against the ends of which the bottom and the wall bear directly. In the embodiment shown in FIGURE 3 the shell consists of tubular middle portion to the ends of which are welded annular end pieces 3a and 3b with L-section. Each of the end pieces has an inwardly directed radial flange on which the bottom and the top, respectively, rests.

Particularly in such cases where no large cupping of the bottom is desired, pre-stretched plates may advantageously be used also for the bottom. When using pre-stretched plates the yield or the longation under the influence of the fluid pressure, for example the static pressure from a water filling is smaller and as a consequence the cupping becomes less pronounced.

FIGURES 4 and 5 show, in section, partial views of annular foundations of concrete and containers resting thereon. The concrete foundation is provided at its upper outer edge with a surrounding steel ring 10 of angle section anchored to the foundation with the aid of cast-in anchoring members 11. As shown in the said drawing figures, the circular wall 3 of the container overlaps the upper edge of the reinforcement ring 10 of the foundation. The bottom 4 of the container may either extend, in accordance with FIGURE 4, into the inner side of the circular wall being welded to the latter, or else, as shown in FIGURE 3, be arranged with the outer edge at some distance from the inside of the circular wall, the bottom being connected with the circular wall with the aid of the horizontal flange of the reinforcement ring. The construction according to the said two drawing figures eliminates the need of the outer flange ring required in the embodiments according to FIGURES 2 and 3, because the foundation is capable in itself of taking up the radial forces set up during the cold-stretching operation.

In containers having a very large diameter it may be necessary to make the foundation in the form of two or more concentrical rings. An example of such a foundation is shown in FIGURE 6. The foundation for the container consists of an outer foundation ring 12 of the type shown in FIGURE 4 and of which an inner foundation 13 which is concentric with the former.

In FIGURE 7 is shown a container intended for storing media having a very high or a very low temperature and a foundation for the container. In this case the annular foundation consists of a lower supporting ring 14 of insulating material and of a stiffening part 15 which rests on the foundation ring 14 and is connected with the bottom and with the circular wall of the container. In the embodiment shown the stiffening part 15 consists of a box structure made up of steel plates and being dimensioned to take up the radial forces set up during normal operation. To prevent the circular wall from changing its shape and to secure the fixing of the outer edge of the bottom during the cold-stretching of the bottom it may be necessary, prior to effecting the cold-stretching, to weld an extra reinforcement flange 16 on to the outside of the circular wall, as indicated with dashed lines. Said extra reinforcing flange can be cut away after completion of the cold-stretching operation.

All the described types of foundation may naturally be provided with holes to render possible access to the outer side to the bottom of the container and/or provided with recesses for the purpose of saving material.

What is claimed is:
1. A method for the manufacture of upright cylindrical containers, particularly cisterns, which comprises:
 (a) making the bottom of the container from essentially flat plates of austenitic stainless steel and joining them together by welding,
 (b) welding a stiffening means to the bottom adjacent the periphery of the bottom, whereby increased resistance to inwardly directed radial forces is achieved, and
 (c) subjecting the welded assembly to the influence of an internal fluid pressure of such a magnitude that the bottom is cold-stretched to a permanent cupped shape,
 (d) said container being mounted on an annular foundation adjacent the periphery of the bottom.

2. The method according to claim 1 wherein said stiffening means comprises at least one annular flange which is welded to the circular wall of the container adjacent its lower peripheral edge.

3. The method according to claim 1 which additionally comprises forming the top of the container by welding together essentially flat plates of austenitic stainless steel, providing stiffening means along the upper edge of the circular wall of the container, and cold-stretching the top to a permanent cupped shape simultaneously with the cold-stretching of the bottom.

4. The method according to claim 1, particularly as applied to the manufacture of containers having a very large diameter, characterized in that the container is built upon a foundation composed of at least two concentric rings.

References Cited
UNITED STATES PATENTS

| | | | |
|---|---|---|---|
| 1,958,421 | 5/1934 | Daniels | 29—493 |
| 1,965,736 | 7/1934 | Dillman. | |
| 2,086,134 | 7/1937 | Ludwick | 113—120 |
| 2,301,061 | 11/1942 | Logeman | 220—18 |
| 2,503,190 | 4/1950 | Branson | 29—421 X |
| 2,725,620 | 12/1965 | McGrath | 29—421 X |

THOMAS H. EAGER, *Primary Examiner.*